United States Patent [19]

Scherenberg et al.

[11] 4,305,357
[45] Dec. 15, 1981

[54] INTERNAL COMBUSTION ENGINE HAVING A MAIN COMBUSTION CHAMBER AND AN IGNITION CHAMBER ASSOCIATED THEREWITH PROVIDED WITH AN IGNITION DEVICE

[75] Inventors: Dieter Scherenberg; Walter Benedikt, both of Stuttgart, Fed. Rep. of Germany

[73] Assignee: Robert Bosch GmbH, Stuttgart, Fed. Rep. of Germany

[21] Appl. No.: 56,744

[22] Filed: Jul. 11, 1979

[30] Foreign Application Priority Data

Jul. 18, 1978 [DE] Fed. Rep. of Germany ....... 2831442

[51] Int. Cl.³ .............................................. F02B 19/08
[52] U.S. Cl. .................................. 123/254; 123/260; 123/263; 123/286; 123/310; 313/143
[58] Field of Search ............... 123/254, 260, 262, 263, 123/273, 286, 293, 290, 268, 310, 169 MG, 169 P, 169 PA, 169 EL; 313/143, 123

[56] References Cited

U.S. PATENT DOCUMENTS

| | | | |
|---|---|---|---|
| 779,778 | 1/1905 | Hagar | 123/293 |
| 1,348,886 | 8/1920 | Leich | 313/143 |
| 2,127,512 | 8/1938 | Harper, Jr. | 123/169 PA |
| 2,171,929 | 9/1939 | Gazda | 313/143 |
| 2,855,908 | 10/1958 | Pflaum | 123/263 |
| 3,304,922 | 2/1967 | Hideg | 123/262 |
| 4,170,979 | 10/1979 | Latsch | 123/260 |

FOREIGN PATENT DOCUMENTS

| | | | |
|---|---|---|---|
| 518346 | 5/1921 | France | 313/123 |
| 640000 | 7/1928 | France | 313/123 |

Primary Examiner—Charles J. Myhre
Assistant Examiner—Andrew M. Dolinar
Attorney, Agent, or Firm—Edwin E. Greigg

[57] ABSTRACT

An internal combustion engine having an ignition chamber communicating with a main combustion chamber via at least one transfer channel, with the ignition chamber forming a closed circular cylinder and its cylindrical wall being protected by an annular thermal pipe from too-rapid cooling and from overheating. In the wall of the ignition chamber, partial electrodes disposed in an insulated manner are provided which are electrically connectable via spark gaps with each other and with the ignition voltage supply line. As a result, ignition occurs near the wall in an area at an elevated temperature level and, in particular, in the immediate vicinity of the entry point of the fresh fuel-air mixture via the overflow channel so that, as a result, the flammability is maintained with increased leaning of the fuel-air mixture.

10 Claims, 5 Drawing Figures

INTERNAL COMBUSTION ENGINE HAVING A MAIN COMBUSTION CHAMBER AND AN IGNITION CHAMBER ASSOCIATED THEREWITH PROVIDED WITH AN IGNITION DEVICE

BACKGROUND OF THE INVENTION

The invention relates to an internal combustion engine. In known internal combustion engines of a similar type, when they are operated with a fuel-air mixture which must be externally ignited, the disadvantage arises that this mixture ignites poorly, especially when it is kept lean in fuel. This causes a nonuniform torque output of the engine. Various attempts have been made to attain a sufficiently positive ignition and reaction of the fuel and air with each other while keeping the proportion of fuel as low as possible, with the intention being to attain a mixture enrichment near the ignition point in the ignition chamber by means of stratification. Beyond this, raising the temperature level in the ignition chamber permits an increase in the ignitability of the lean fuel-air mixture. However, the occurrence of spontaneous ignition and premature wear because of overly high temperatures must be avoided.

In a known apparatus, the temperature of the ignition chamber wall was controlled with this purpose in mind. This is accomplished by using a thermal pipe surrounding the ignition chamber which, so long as the ignition chamber is cold, prevents the immediate conduction of the head produced there away to the cooled chambers of the internal combustion engine and assures that an increased heat conduction to the cooled walls of the internal combustion engine only appears at high temperatures which can be set as needed.

In this known apparatus, it was further proposed to permit the ignition spark gap to skip over between one electrode and the wall of the ignition chamber within the boundary layer. However, an increased leaning of the operational mixture and thus an increase in the wall temperature of the ignition chamber required for positive ignition, causes excessive overheating of the electrodes and glow sparking with subsequent thermal destruction of the electrodes. This is particularly true when the electrodes, in order to maintain the ignitability, are exposed directly to the fresh mixture flowing in and out of the ignition chamber or to the burned mixture at the entry of the transfer channel. Other possible solutions to the problem, which shift the ignition location to portions of the ignition chamber which are sufficiently remote from the entry point of the transfer channel can not, however, be operated with the desired degree of leaning or must be provided with a very expensive flushing system in order to free the ignition chamber sufficiently of hot remnant gases before it is supplied with fresh mixture.

OBJECT AND SUMMARY OF THE INVENTION

The internal combustion engine in accordance with the invention has the advantage over the prior art in that an ignition can be effected in the area near the wall and also immediately adjacent to the entry point of the transfer channel into the ignition chamber, so that conventional spark plugs can be used for the supply of the ignition energy. The heat stressing of the electrodes can thus be controlled by means of the temperature-controlled wall of the ignition chamber. The additional capacity furnished by providing several ignition points in a series in the region near the wall and at an elevated temperature level offers the opportunity of keeping the fuel-air mixture to be ignited very lean in fuel. Contributing to this are the high temperature level in the area near the wall and the stabilized flow within the boundary layer. Furthermore, at the ignition point near the transfer channels, the high degree of homogeneity of the fuel-air mixture, which has been exposed previously to high turbulence in the transfer channel, and the high level of freedom from remnant gas have a positive effect on flammability.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
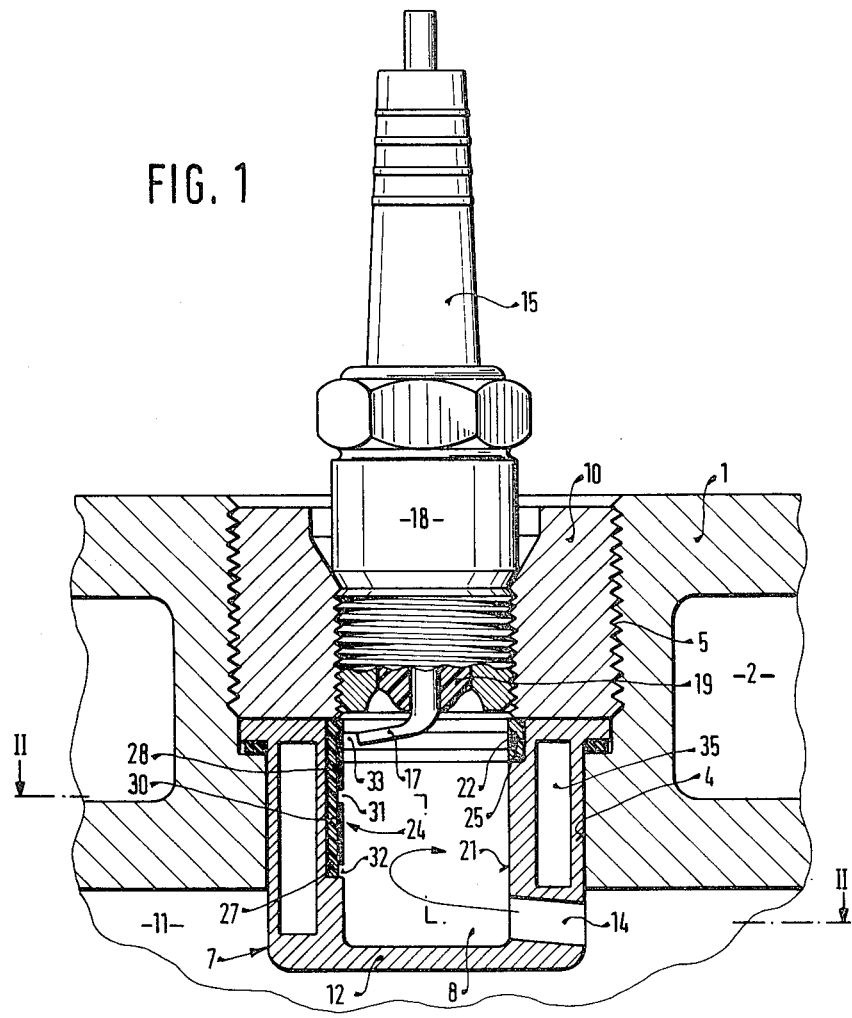
FIG. 1 shows a first embodiment of the invention having a spark plug inserted on the front side of the ignition chamber with a bent, hook-like middle electrode and an annular partial electrode with an axial continuation in the wall of the ignition chamber.

FIG. 1 shows a portion of a combination chamber wall 1 of the internal combustion engine having cooling chambers 2 through which cooling fluid flows. The combustion chamber wall 1 has a stepped bore having portions 4, 5 whose diameter decreases toward the main combustion chamber 11 and whose upper portion 5 has a larger diameter provided with an interior threading. In the lower stepped bore portion 4, an insert 7 is tightly inserted, which is fixed in its position by means of a screw element 10 screwed into the upper stepped bore portion 5. The insert 7 is cup-shaped and contains an ignition chamber 8, which communicates via at least one transfer channel 14 with the main combustion chamber 11. The insert 7 projects into the main combustion chamber 11 to such an extent that the transfer channel 14 can exit freely into the combustion chamber 11. The transfer channel 14, of which there may be several, depending on the form of the main combustion chamber 11, extends substantially radially to the central axis of the ignition chamber 8 and tangentially to its diameter and exits the ignition chamber 8 immediately before the floor 12 on the side of the main combustion chamber 11.

The front side of the cup-shaped insert 7 opposite the floor 12 is formed by a spark plug 15 screwed centrally into the screw element 10 which tightly closes the ignition chamber 8 on this side. The spark plug 15 has a bent hook-like middle electrode 17 bent toward one side which, in a conventional manner, is held by a spark plug insulator 19 inserted into the housing 18 of the spark plug 15.

A ring 22 is set into the cylindrical wall 21 of the ignition chamber 8 in the radial plane in which the hook-like middle electrode 17 ends, and this ring 22 is part of a partial electrode 24. The ring 22 is located in an insulator bed 25 which is so embedded into the cylindrical wall 21 that the free surfaces of the ring 22 and of the insulator bed 25 are in alignment with the rest of the cylindrical wall 21.

Figure 2:
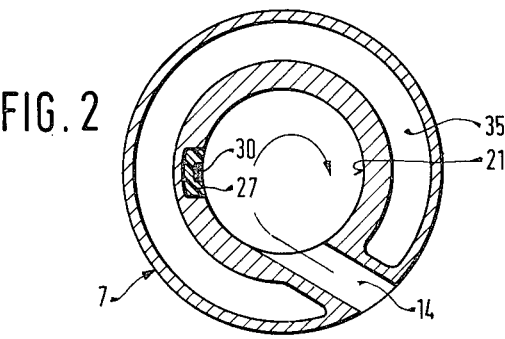
FIG. 2 is a sectional view taken substantially along line 2—2 of FIG. 1 in the direction of the arrows.

At a point in the cylindrical wall 21 approximately opposite to the entry direction of the transfer channel 14, a further insulator bed 27 is set into the cylindrical wall 21. The orientation of the transfer channel 14 to the angular positon of the insulator bed 27 can be seen in the sectional view of FIG. 2 through the insert 7. This insulator bed 27 extends parallel to the central axis of the ignition chamber 8 and ends approximately in the lower third portion of the axial extension of the ignition chamber 8, that is, that third portion which is oriented toward the main combustion chamber 11.

A rod-like element 28 of the partial electrode 24 is set into the insulator bed 27. This element 28 ends approximately in the middle of the axial extension of the ignition chamber 8. As a continuation of the rod-like element 28 of the partial electrode 24, a second partial electrode 30, which is also preferably rod-like is inserted into the insulator bed 27. Between the rod-like element 28 and the second partial electrode 30 and the wall of the ignition chamber 8, a second, final spark gap 32 is formed. Since both spark gaps 31 and 32 extend in the plane of the wall surface, which here is formed by the insulator bed 27, these gaps 31, 32 are creepage spark gaps. The electrical connection between the partial electrode 24 or the partial electrode 30 and the middle electrode 17 which supplies the ignition energy is provided by a third spark gap 33 between the end of the hook-like middle electrode 17 and the ring 22.

Disposed over the entire axial length of the cylindrical wall 21 in the wall of the insert 7 is an annular thermal pipe 35, which has a recess only at the passage therethrough of the transfer channel 14. The thermal pipe 35 is provided in a conventional manner with an evaporator element, a condensation element and a transport element which supplies the condensed evaporator medium even against the force of gravity by making use of the known effect of capillary action. To this end, the walls of the thermal pipe are fissured in the manner of capillaries, which is attainable, for example, by means of an embedded heat-resistant net, by means of porous coatings on the walls or by cutting a capillary structure into the surface. Thermal pipes are known per se and need not be described as to their function in further detail here. The thermal pipe 35 is filled with an evaporator medium which is selected so that the desired maximum temperature can be maintained, with respect to the geometric layout of the ignition chamber, the combustion conditions, and the cooling conditions at the cylindrical wall 21 of the ignition chamber 8.

With the aid of the thermal pipe 35 and its heat conduction characteristic, a uniform temperature distribution can be attained over the entire cylindrical chamber wall 21. By means of the thermal pipe 35, a heat insulation is attained during warm-up of the internal combustion engine such that the heat arising in the ignition chamber during combustion can flow off to the cooling chambers 2 of the internal combustion engine only to a very limited extent. In the cold state, below the vaporization temperature of the evaporator medium, the increased heat conductivity of the thermal pipe is made ineffective, so that in this state, the thermal pipe 35 acts as an insulator. Only under conditions of severe heating does the thermal pipe 35 come into effect and then, in the operationally warm state, prevents the cylindrical wall 21 from overheating. Thus, very rapid heating of the ignition chamber walls and the capacity to ignite even a very pronounced leaned fuel-air mixture are obtained.

The fuel-air mixture introduced into the main combustion chamber 11 is compressed during the compression stroke of the piston (not shown here) and introduced as well into the ignition chamber 8 via the transfer channel or channels 14 to be there ignited at the given ignition time. By means of the particular form of the transfer channel 14 and the cylindrical form of the ignition chamber 8, the entering mixture is brought into rotating motion with the creation of a first vortex, which rises at high angular velocity along the cylindrical wall 21 toward the end of the vortex chamber toward the spark plug side. Because of the entry direction of the mixture flow, which deviates only slightly from a right angle to the cylinder axis of the ignition chamber 8, this vortex has a large radial component and only a small component in the direction of the cylinder axis, so that high circumferential velocities occur. Thus the second spark gap 32 is intensively flushed free of remnant gases. As a result of the high circumferential velocity, on the one hand, a uniform distribution of the fuel and the air components is achieved and on the other hand, a dissociation of components is attained, so that the introduced mixture is enriched with fuel in the areas of the ignition chamber 8 near the wall 21. This increases the ignitability of the mixture. By means of the rising first vortex, the remnant gases still present after the previous combustion cycle are forced by a second vortex, which flows axially back, from the ignition chamber walls into the interior of the chamber 8. As a result, in the vicinity of the spark gaps, only small amounts of remnant gases are to be expected.

Furthermore, the charge of the ignition chamber is intensively heated at the optionally temperature-controlled wall 21, so that before the ignition time, in normal operation, a temperature is already reached by the mixture which lies only a little below the spontaneous ignition temperature. Thus, in an advantageous manner, the energy required for ignition is reduced and the ignitability increased at a high capacity for leaning the mixture.

The spark gaps, particularly the first spark gap 31 and the second spark gap 32, are located as creepage spark gaps in the immediate vicinity of the wall 21, where within the boundary layer, a laminar flow having a low average velocity prevails. This increases the ignitability of the mixture as well.

While the third spark gap 33 between middle electrode 17 and the partial electrode ring 22 furnishes the electrical contact at every point of the rotary position of the spark plug 15, one, two or more spark gaps may be provided along the cylindrical wall 21 in the axial direction, which may be adapted to the dynamics of the mixture movement in the ignition chamber 8.

Figure 3:
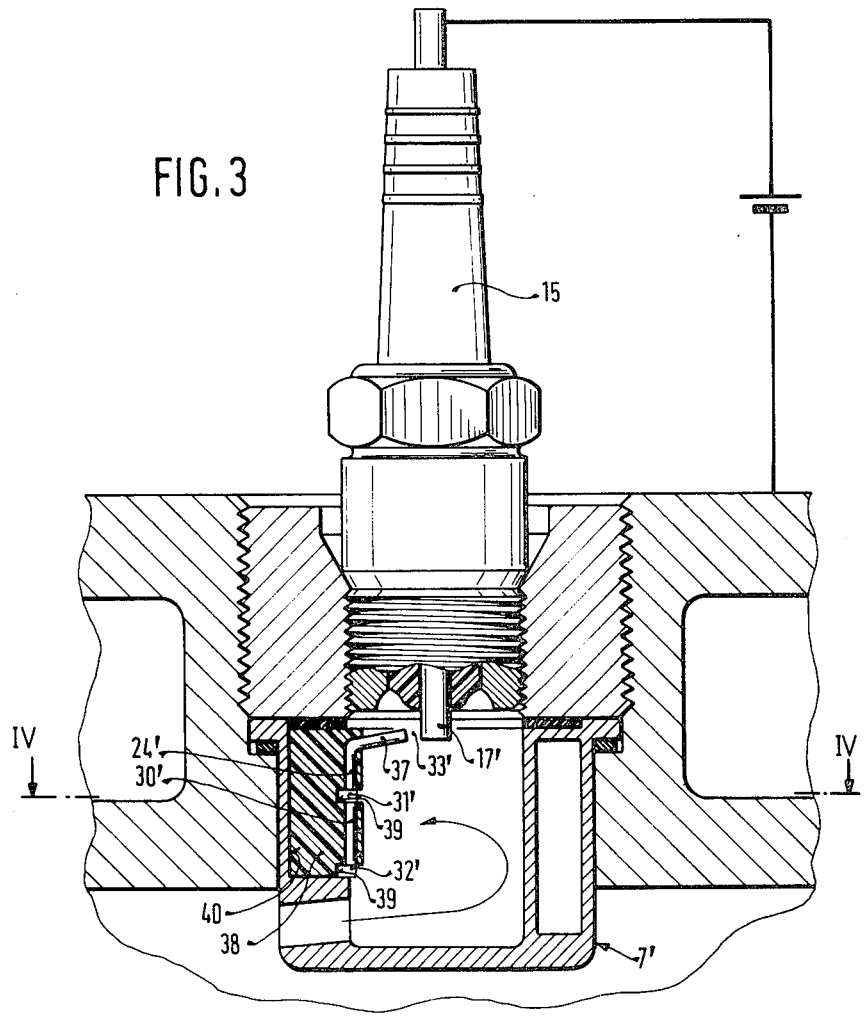
FIG. 3 is a second embodiment of the invention having a spark plug provided with a straight middle electrode.

In the embodiment of the invention shown in FIG. 3, there is an alternative form of embodiment of the invention shown in FIG. 1. The parts used are substantially shaped and disposed in the same manner, so that with respect to their description, reference can be made to the embodiment of FIG. 1 and the same parts have the same reference numerals. As to the differences from the embodiment of FIG. 1, the spark plug 15 has a middle electrode 17' of straight configuration or in a tang-like fashion. To provide the electrical connection via a third spark gap 33', the partial electrode 24' has a hook-shaped part 37 bent toward the middle electrode 17' and projecting freely into the ignition chamber 8. As a result, a spark gap 33' of equal size, independent of the rotary position of the spark plug 15, is attained.

Figure 4:
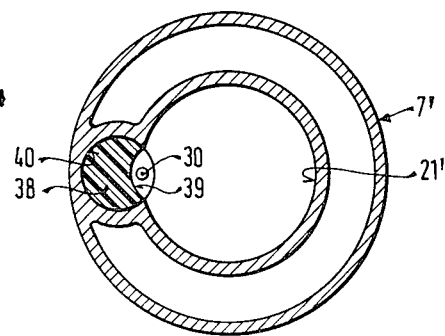
FIG. 4 is a sectional view taken substantially along line 4—4 of FIG. 3 in the direction of the arrows.

The partial electrode 24' with its axially extending part and a second partial electrode 30' are entirely embedded in an insulating body 38, which, as shown in FIG. 4, is of a circular cross-sectional shape and is inserted axially as a tang into the wall of the insert 7'. To create the first spark gap 31' and the second spark gap 32', the insulating body 38 is provided with recesses 39, which separate the partial electrodes 24', 30' from one another and from the cylindrical wall 21 of the ignition chamber 8. The sparks arising at gaps 31', 32' as opposed to the embodiment of FIG. 1, are no longer creepage spark gaps. As a result of this arrangement in FIG. 3, the provision of the spark gaps in the region of the cylindrical wall 21 and the securing of the electrical connection to the middle electrode 17' are made simpler. By cutting into the insulating body 38 a plurality of spark gaps can be easily provided at desired locations. The recesses 39 cut into the insulating body 38, are shown in FIG. 4, which is a sectional view taken through the insert 7'.

Figure 5:
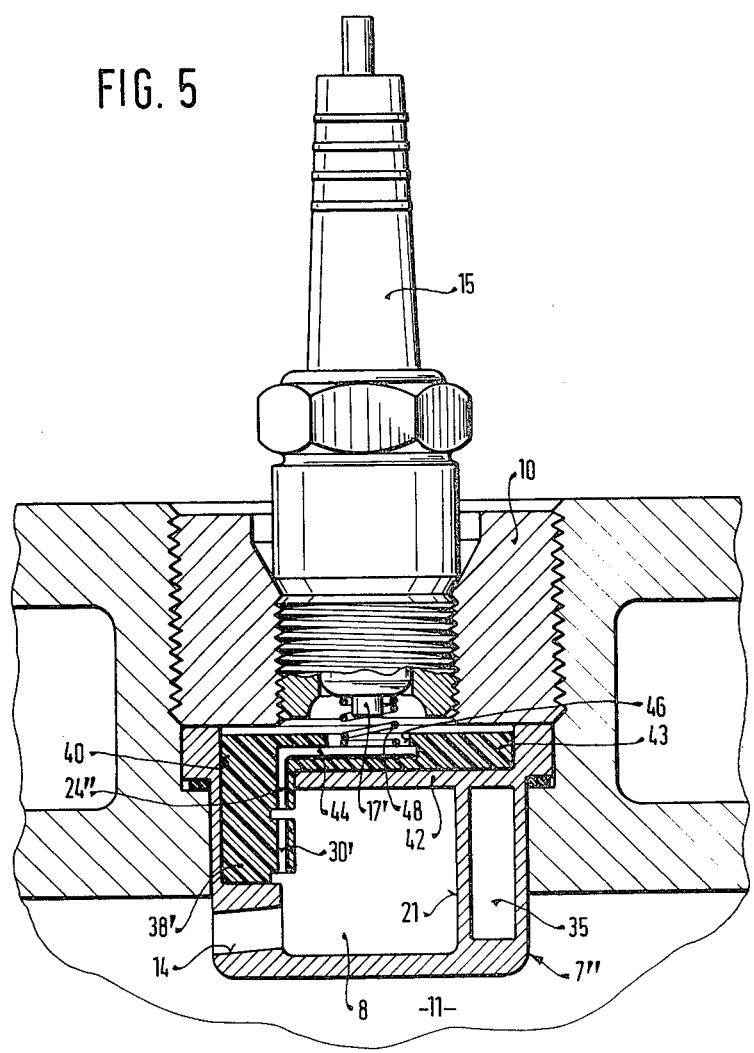
FIG. 5 is a third embodiment of the invention showing the adjacent chamber in which the ignition chamber is embodied as a closed insert and in which the partial electrode inserted into the ignition chamber wall is guided toward the outside and there brought into conductive contact with a conventional spark plug.

The third embodiment of the invention shown in FIG. 5 has an insert 7" which has the same form from the outside as in the embodiments of FIGS. 1 and 3. Here, as well, there is an annular thermal pipe 35 provided along the cylindrical wall 21, which pipe is interrupted only in the region of the transfer channel 14 and of the insulating body 38' inserted axially into the wall in the same manner as in the embodiment of FIG. 3. The axial portion of the insulating body 38', as in the embodiment of FIG. 3, contains the partial electrode 30' and the axial portion of a partial electrode 24".

As distinguished from the embodiment of FIG. 3, however, the insert 7" is completely closed on both front faces. The cylindrical insulating body 38' is inserted into an axial bore 40 in the wall of the insert 7" just as in the embodiment of FIGS. 3 and 4. The bore 40 is cut through the bore which comprises the cylindrical ignition chamber 8, so that a portion of the insulating body 38' inserted into the bore 40 projects into the ignition chamber 8 in such a manner that the partial electrodes 30' and 24" embedded in the cylindrical insulating body 38' are disposed in alignment with the cylindrical wall 21.

On the front face 42 of the insert 7" remote from the main combustion chamber 11, a second insulating body 43 is embedded from the outside. However, it can also be formed as a single piece with the cylindrical insulating body 38'. In this advantageous embodiment, a plate-shaped part 44 of the partial electrode 24" is embedded in the second insulating body 43. The plate-shaped part 44 thereby extends at a right angle to the axial portion of the partial electrode 24" and through the axis of the insert 7". In the region of the axis of the insert 7", the second insulating body 43 has a recess 46, so that the plate-shaped part 44 is exposed at this point and can be contacted from the outside.

The insert 7", in the same manner as in the embodiments of FIGS. 1 and 3, is held in the stepped bore 4, 5 by means of the screw element 10. The screw element 10 further serves to receive the spark plug 15, which in the same manner as in the embodiment of FIG. 3 has a middle electrode 17', which ends in tang-like fashion. Between the middle electrode 17' and the plate-shaped part 44, a spring 48 is provided which furnishes a conductive contact between the middle electrode 17' and the partial electrode 24".

In the embodiment of FIG. 5, the spark plug 15, which is of conventional design per se, is disposed entirely outside the ignition chamber 8 and is thus thermally stressed to only a very limited extent. For this reason, a very simply designed spark plug can be used. The partial electrodes 24" and 30' form the spark gap in the same manner as in the embodiments of FIGS. 1 and 3. Since it is also important that ignition take place right in the region of the remnant gas-free mixture and, on the other hand, the spark gaps are intended to be sufficiently well flushed free of remnant gases, so that positive ignition is also attained in the event of severely leaned operational mixtures, a third spark gap 33, or 33' as in the embodiments of FIGS. 1 and 3, can be omitted. Otherwise, the embodiment of FIG. 5 has the same advantages with respect to the opportunity for leaning the operational mixture and the assurance of ignitability of this mixture.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. An internal combustion engine having a main combustion chamber and cooling means comprising, in combination, an ignition chamber having a cylindrical wall and at least one transfer channel for communicating said ignition chamber with said main combustion chamber, said ignition chamber comprising a closed end circular cylinder having a cylindrical lowered portion of said wall projecting into said main combustion chamber, said at least one transfer channel extending substantially radial to the axis of said cylinder and tangential to the circumference of said cylinder, an ignition device having a first electrode which ignites toward said cylindrical wall of said ignition chamber, an annular thermal pipe for separating said cylindrical wall at least partially from said cooling means of the internal combustion engine so that the wall temperature can be controlled by means of the heat conduction capacity of said thermal pipe which is variable in accordance with temperature, said ignition device having an electrode assembly for supplying the ignition voltage and isolated with respect to ground, said ignition device electrode assembly comprising a plurality of electrode elements arranged in series and separated from each other to form at least first and second spark gaps and being adapted to be electrically connected to a source of ignition voltage, a counter electrode formed by a surface of said ignition chamber cylindrical wall at a level just above said transfer channel one of said plurality of electrode elements being arranged to form a last ignition location along said cylindrical wall between a spark gap formed by said one electrode and said counter electrode.

2. An internal combustion engine in accordance with claim 1, wherein said last ignition location is disposed within said cylindrical wall of the said ignition chamber opposite the projected cross-sectional area of said transfer channel.

3. An internal combustion engine in accordance with claim 1 wherein said ignition device for supplying the ignition voltage includes a spark plug that forms an end face of said ignition chamber, said spark plug having a middle electrode insulated from ground; and at least one of said electrode elements forming a partial electrode extending substantially in the axial direction of said cylindrical wall toward the entrance opening of said transfer channel and insulated with respect to said ignition chamber cylindrical wall and a third spark gap for electrically connecting said middle electrode with said partial electrode.

4. An internal combustion engine in accordance with claim 3, including a ring insulatedly disposed on said ignition chamber cylindrical wall said middle electrode of said spark plug being bent in hook-like fashion toward said ring and wherein said ring is part of said partial electrode.

5. An internal combustion engine in accordance with claim 3, wherein said middle electrode terminates in a tang-like configuration and a spark gap for electrically connecting said middle electrode with a portion of said partial electrode projecting in hook-like fashion into said ignition chamber.

6. An internal combustion engine in accordance with claim 2, wherein said ignition device includes a spark plug having a middle electrode for supplying an ignition voltage and including a partial electrode having a part extending out of said ignition chamber, said partial electrode otherwise extending substantially in an axial direction toward the entrance opening of said transfer channel in said cylindrical wall and electrically insulated from said ignition chamber, said partial electrode part extending out of said ignition chamber arranged in electrically conductive contact with said middle electrode.

7. An internal combustion engine in accordance with claim 6, including an insulating body for supporting said middle electrode, said middle electrode being arranged to project as a middle tange out of said insulating body, a compression spring, said middle electrode being electrically connectable by means of said compression spring with said part of said partial electrode extending out of said ignition chamber.

8. An internal combustion engine in accordance with claim 3 wherein said partial electrode is subdivided at least once to thereby form at least said first spark gap.

9. An internal combustion engine in accordance with claim 3, wherein said ignition chamber cylindrical wall is provided with a bore opening in a slit-like fashion axially and radially toward said ignition chamber and including a bolt-like insulating body inserted into said bore, so that a portion of said insulating body projects into the ignition chamber and wherein said partial electrode is embedded in said bolt-like insulating body.

10. An internal combustion engine in accordance with claim 8, characterized in that the distance forming at least one of said spark gaps is defined by an insulating material surface whereby the ignition spark therebetween is in the form of a creepage spark.

* * * * *